W. J. HENDERSON.
Fish-Trap.

No. 218,737.   Patented Aug. 19, 1879.

WITNESSES:
Francis McArdle
C. Sedgwick

INVENTOR:
W. J. Henderson
BY Munn & Co
ATTORNEYS.

UNITED STATES PATENT OFFICE.

WILLIAM J. HENDERSON, OF VALDOSTA, GEORGIA.

IMPROVEMENT IN FISH-TRAPS.

Specification forming part of Letters Patent No. 218,737, dated August 19, 1879; application filed June 7, 1879.

*To all whom it may concern:*

Be it known that I, WILLIAM J. HENDERSON, of Valdosta, in the county of Lowndes and State of Georgia, have invented a new and Improved Trap, of which the following is a specification.

Figure 1:
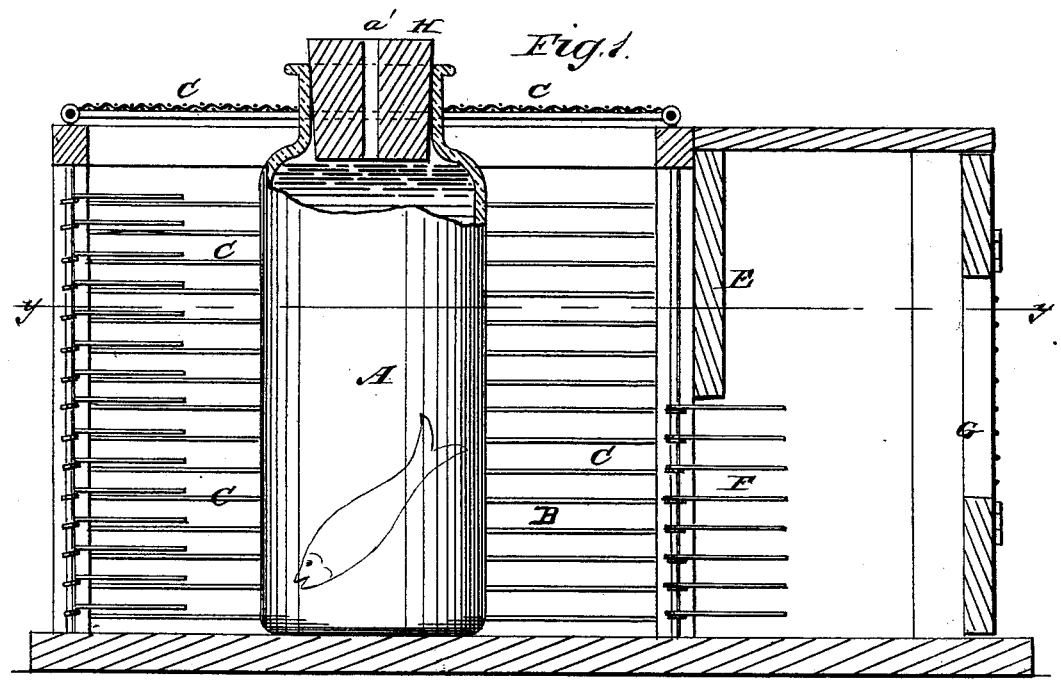
Figure 2:
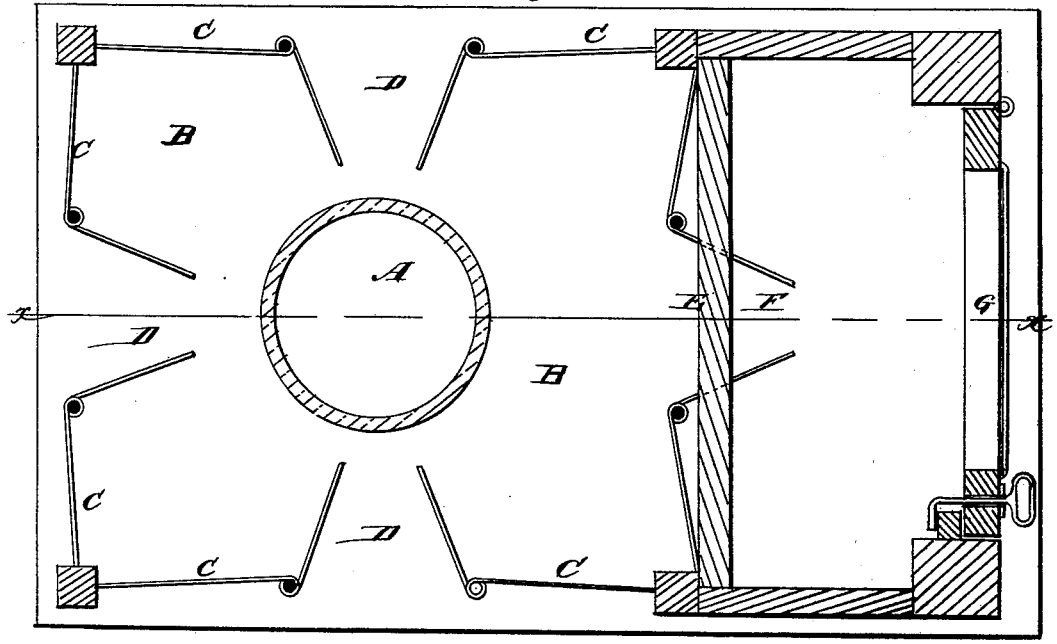

Figure 1 is a longitudinal sectional elevation of the device on line $x\,x$, Fig. 2. Fig. 2 is a horizontal section on line $y\,y$, Fig. 1.

Similar letters of reference indicate corresponding parts.

The object of this invention is to furnish a cheap, simple, and most effective device for catching fish, birds, animals, &c.

The invention consists in combining a transparent bottle with a rat-trap, so that the fish or animal may be caught without consuming the bait, as hereinafter described.

A is a glass vessel to receive the bait, and is placed within the trap B so that it may be easily seen by the fish, bird, or animal that it is intended to attract. That portion of the trap in which the glass vessel is placed has its sides and top preferably constructed of wire or iron or wooden rods C C, and the passages D for ingress are formed, as in the ordinary rat-trap, by the inward projection of the wires or rods in such a manner as to prevent egress.

The other portion of the trap is separated from the first by a partition, E, through which there is a passage, F, leading from the first, and so guarded by wires or rods that there can be no return through it. This part of the trap is also provided with a door, G, through which whatever is caught may be removed.

When wishing to catch fish, water is put into the glass vessel A, and the bait, preferably live bait, introduced therein, and the vessel then closed and placed within the trap, which is then lowered to the proper depth in the water. The fish seeing the bait will strike at it through the passages D, and be caught within the trap, and in the endeavor to find a way out will enter the other part of the trap, where they must remain until removed. Thus many fish may be caught with one bait, and the bait still remain in as good a condition as ever.

When worms are used for bait they may be suspended by a string within the glass vessel, so that their contortions shall attract, or may be allowed to rest upon the bottom of the vessel.

The stopper H of the glass vessel A is usually provided with one or more holes, $a'$, for the admission of fresh water or air, as the case may be, in order to keep the bait in good condition.

Lizards, bugs, crickets, &c., may be used as bait, and kept alive under the water by fitting a tube of rubber or other flexible material to the hole $a'$ in the stopper of the vessel A for a sufficient supply of air, and retaining the upper end of the tube above water.

The trap and the vessel inclosing the bait may be of any size required.

For catching alligators the trap should be constructed of strong iron or steel bars, and the glass vessel containing the bait should be inclosed within or protected by like bars.

A dog might be used for alligator-bait, and be kept alive under water for many days by air and food supplied to the glass vessel through a flexible tube.

Corn or grain will be placed within the glass vessel to attract and catch birds, squirrels, &c.

I am aware that there have been many kinds of traps and nets devised for catching birds, fish, and animals, and that many ways have been devised for baiting them; but,

Having thus described my invention, I claim as new and desire to secure by Letters Patent—

1. In a trap, the within-described glass vessel A, for containing the bait, substantially as herein shown and described.

2. The within-described glass vessel A, provided with a ventilating-stopper, H, in combination with the trap B, provided with a partition, E, passage F, and door G, substantially as and for the purpose described.

WILLIAM JACKSON HENDERSON.

Witnesses:
  I. P. JONES,
  R. A. PEEPLES.